B. H. SCHAFF.
REAMER.
APPLICATION FILED MAR. 21, 1913.
1,101,471.
Patented June 23, 1914.
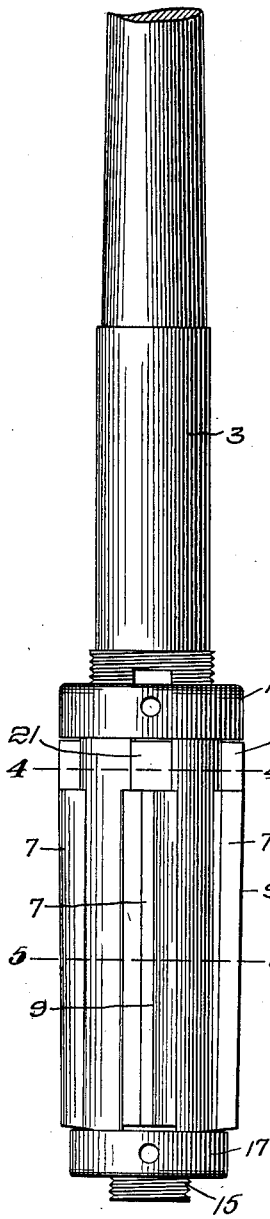
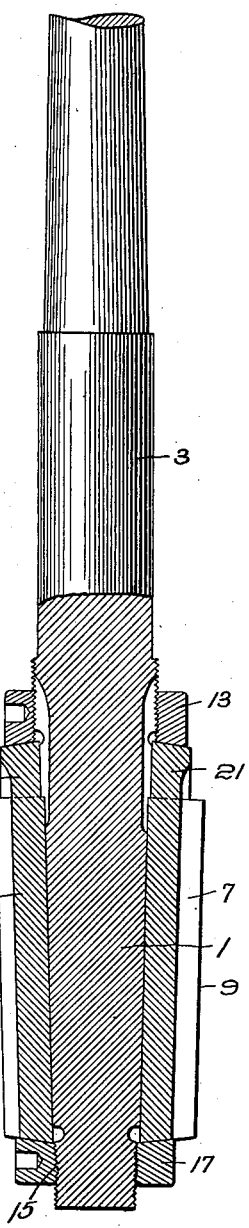
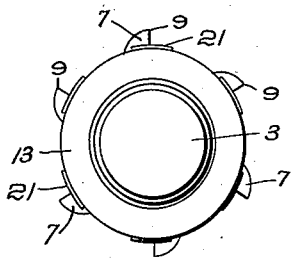
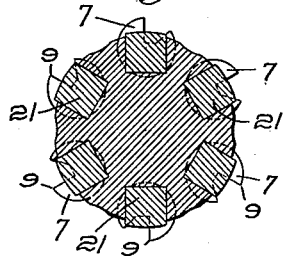
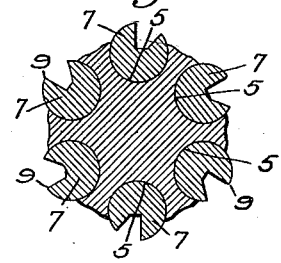
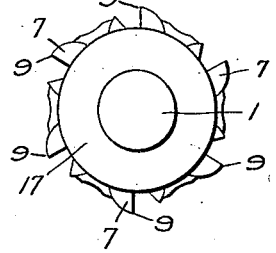
Witnesses:
Horace A. Grossman
Carl L. Choate.
Inventor:
Benjamin H. Schaff.
by Emery, Booth, Janney & Varney
Attys.

UNITED STATES PATENT OFFICE.

BENJAMIN HARRY SCHAFF, OF PLAINFIELD, NEW JERSEY, ASSIGNOR TO SYDNEY BEVIN, OF FLUSHING, NEW YORK.

REAMER.

1,101,471.            Specification of Letters Patent.        Patented June 23, 1914.

Application filed March 21, 1913. Serial No. 755,882.

*To all whom it may concern:*

Be it known that I, BENJAMIN H. SCHAFF, a citizen of the United States, and resident of Plainfield, New Jersey, have invented an Improvement in Reamers, of which the following description, in connection with the accompanying drawings, is a specification, like characters on the drawings representing like parts.

This invention relates to reamers, and more particularly to means for securing the cutting blades to the body of the reamer.

The character of the invention may be best understood by reference to the following description of an illustrative embodiment thereof shown in the accompanying drawing, wherein:

Figure 1 is a side elevation of an illustrative reamer embodying the invention; Fig. 2 is a view partly in longitudinal section and partly in side elevation of said reamer; Fig. 3 is a top view of the reamer shown in Fig. 1; Fig. 4 is a transverse section taken on line 4—4 of Fig. 1; Fig. 5 is a transverse section taken on line 5—5 of Fig. 1; and Fig. 6 is a bottom view of Fig. 1.

Referring to the drawing, the illustrative reamer there shown as embodying the invention comprises a body 1 having a shank 3 and provided with a series of longitudinal grooves 5 receiving cutting blades 7, longitudinally notched to provide cutting edges 9. In order to hold the cutting blades from lateral displacement from the grooves each of the latter preferably has a circular arc section greater than 180 degrees. The blades have cylindrical portions which are slid into the grooves and because of this extent of arc the blades are securely laterally locked therein.

The reamer body 1 is tapered and the grooves 5 parallel said body and accordingly are inclined toward the axis of said body. If the blades are adjusted longitudinally in their grooves they will vary the effective diameter of the reamer. To effect this adjustment a portion of the reamer between the body 1 and the shank 3 is threaded to receive an adjusting nut 13 adapted to engage the ends of the cutting blades adjacent thereto. The end of the body 1 is also threaded as at 15 to receive an adjusting nut 17 provided with one or more holes for receiving a spanner wrench. It will be apparent that by adjusting these nuts the blades may be slid longitudinally of their grooves in order to vary the effective cutting diameter of the reamer as desired. The nuts 13 and 17 have concave faces for engagement with the ends of the cutting blades so that when the nuts are set up they tend to take up wear and press the blades firmly into the seats of their grooves.

An important feature of the invention relates to the provision of simple and effective means for preventing rotation of the blades in their grooves. To this end each blade is provided with a shank or projecting portion 21 slabbed off or milled to present locking sides for engagement with similarly shaped slots in the reamer body 1 beyond and communicating with the cutter blade receiving grooves 5. To facilitate the forming of the latter they may be extended to present shallow grooves in the thread portion receiving the nut 13. The blade shanks 21 are preferably somewhat longer than the slots receiving them so that the latter will not unduly limit the adjustment of the blades by the nut 13, but on the contrary the blades will be free to be adjusted in their grooves to vary the effective diameter of the reamer as desired. By this construction of blade shank it is merely necessary to insert the blades in their grooves with the shanks in their slots in order to lock the blades against rotation. No other locking means or adjustment is necessary.

The reamer described is extremely simple in construction and operation. It consists of few parts, which are readily assembled and adjusted. If either of the locking nuts 13 or 17 should become loose, the blades being free to slide longitudinally in their grooves, in operation would be pressed longitudinally toward the shank of the reamer into tight engagement with the locking nut 13. There would be no liability of one blade sliding farther than the other and thereby creating an abnormal projection beyond the line or cutting circle formed by the cutting edges of the other blades since all of the blades are free to slide equally in their grooves excepting as limited by their holding nuts. If each individual cutting blade were held in its seat against rotation by a pin the simultaneous and uniform operation of the blades could not be relied upon since if one of the pins became loose or broken, its cutting blade might rotate in its groove and cause the cutting edge 9 to turn toward the longitudinal axis of the body of the reamer and thereby become out of line of the cutting circle and ineffective as a cutting element. The holding shanks 21 may be of such large cross-section and resultant strength that there is no possibility of their being broken or weakened to permit the rotating of the blades in the grooves, but on the contrary the cutting blades are continuously held in the same positions of rotative adjustment in which all of their cutting edges 9 are simultaneously active.

It will be understood that the invention is not limited to the particular embodiment thereof shown in the accompanying drawing but various deviations may be made therefrom without departing from the spirit and scope of the claims appended hereto.

What I claim as new and desire to secure by Letters Patent is:—

1. A reamer comprising, in combination, a body having grooves of circular arc section terminating in locking slots; cutting blades having portions fitting in said grooves and shanks fitting said slots, said slots and shanks being formed to prevent rotation of said blades in said grooves; and means coöperating with said body for holding said blades against longitudinal movement in said grooves.

2. A reamer comprising, in combination, a body having grooves of circular arc section inclined toward the axis of said body and terminating in locking slots; cutting blades having portions fitting and adapted to slide longitudinally in said grooves and having shanks fitting said slots, said slots and shanks being formed to prevent rotation of said blades in said grooves in different positions of adjustment of said blades; and means coöperating with said body for holding said blades and shanks in different positions of longitudinal adjustment in said grooves and slots.

In testimony whereof, I have signed my name to this specification, in the presence of two subscribing witnesses.

B. HARRY SCHAFF.

Witnesses:
ANDREW J. GAVETT,
F. B. NEWELL, Jr.

---

Copies of this patent may be obtained for five cents each, by addressing the "Commissioner of Patents, Washington, D. C."